United States Patent Office 3,410,651
Patented Nov. 12, 1968

3,410,651
METHOD OF TREATING EXHAUST GASES OF INTERNAL COMBUSTION ENGINE AND CATALYST THEREFOR
John T. Brandenburg and Robert J. Leak, Wappingers Falls, N.Y., assignors to Texaco Inc., New York, N.Y., a corporation of Delaware
No Drawing. Continuation of application Ser. No. 251,067, Jan. 14, 1963. This application Jan. 2, 1968, Ser. No. 695,285
15 Claims. (Cl. 23—2)

ABSTRACT OF THE DISCLOSURE

A method of treating exhaust gases of internal combustion engines and a catalyst structure therefor comprising an alumina coated metal filament substrate having deposited on the first portion thereof an alkali metal or alkaline earth metal chromate and having deposited on the second portion thereof an oxidation catalyst. The chromate portion of the catalyst structure removes lead compounds from the exhaust gases while the oxidation catalyst portion effects the oxidation of the impurities.

This application is a continuation of our copending application Ser. No. 251,067, filed Jan. 14, 1963 and now abandoned.

This invention relates to a method for the treatment of exhaust gases from internal combustion engines operated with motor fuel containing lead compounds. This invention also relates to catalytic structures employed in treatment of exhaust gases and to the method of preparing such structures.

Internal combustion engines generally operate under fuel-air mixtures which are richer than stoichiometric, with the result that the exhaust products of combustion contain residual combustible compounds including carbon monoxide, hydrogen and hydrocarbons. In recent years, automotive exhaust gas pollution control has become exceedingly important, and numerous methods have been proposed for promoting the oxidation of the combustible compounds in the exhaust gas system. For this purpose, afterburners or catalytic combustion chambers have been proposed for use in the exhaust system, which generally comprise an oxidation catalyst supported on ceramic or refractory bases.

In order to increase the octane rating of the fuel, an organic lead compound, such as tetraethyl lead, is often added to motor fuels. The lead compounds contained in the exhaust products from the engine operated on such fuels adversely affect many oxidation catalysts which might be employed in exhaust systems thereby decreasing the activity of the catalysts in a relatively short period of time.

It is an object of our invention to provide in the treatment of exhaust gases containing lead compounds both a method and structure for substantially removing the lead compounds from the exhaust gases, and also, in combination therewith, for the catalytic oxidation of combustible compounds in the exhaust gases. Still another object is to provide a method of preparing the structure of the above type. These together with other objects and advantages will be apparent to one skilled in the art upon reading the following description.

The novel structure of our invention involves broadly a substrate, preferably of extended dimensions, having an adherent film or layer of alumina formed thereon. The film of alumina deposited or formed on the substrate is sufficiently tenacious to withstand ordinary usage and is not damaged or impaired upon relatively severe abrading, jarring, etc. A chromium compound capable of reacting with lead or lead compounds in exhaust gases is deposited on the alumina film adhering to the substrate. When the exhaust gases emitted from the engine contact the chromium-containing material, lead compounds contained in the exhaust gases react with the chromium compound and resulting reaction products retained on the alumina film act as oxidation catalysts. The exhaust gases may then be further contacted with a suitable oxidation catalyst, e.g., one which is susceptible to lead poisoning, to effect more nearly complete oxidation of the combustible, compounds, as explained more fully hereinbelow.

In the preferred embodiment of our invention, the structure comprises two parts, sections or divisions. Accordingly, one part of the structure bearing the alumina film is impregnated with the chromium compound, and a second part impregnated with oxidation catalyst. The structure may be, for example, a single unit having the chrominum compound deposited toward one end thereof or the structure may be in two or more separate sections, with one section having the chromium compound deposited thereon and the other, an oxidation catalyst. The structure is arranged in the exhaust system such that the exhaust gases first contact the chromium-containing material, and thereafter contact the oxidation catalyst. In this manner, the lead compounds which would otherwise poison the catalyst are substantially removed before contacting the oxidation catalyst thereby greatly extending the life of the catalyst.

Where deemed desirable, air may be admixed with the exhaust gases to promote the catalytic oxidation of the combustibles. Air may be added at any desirable position such as at the exhaust manifold, muffler or exhaust pipe. It is preferable that air be admixed with the exhaust gases after the gases have contacted the chromium-containing material and before contacting the oxidation catalyst.

In accordance with this invention, a substrate is provided with an adherent film of alumina formed by contacting the substrate with a solution of an alkali metal aluminate, e.g., sodium aluminate. The substrate is preferably of extended dimensions, and is particularly of a length and geometric surface area substantially greater than that of discrete particles. The substrate employed in the structure of our invention is not restricted to any particular configuration nor to any particular material. The substrate may be formed of a metal or non-metal, any may include such materials as steel, stainless steel, alloy steel, iron, iron alloys, nickel, chrome-nickel alloys, or titanium, including sintered metal materials, or refractory or ceramic materials, including, for example, high melting glass, refractory metal oxides, e.g., magnesia and silica, or refractory metal silicates or carbides. The configuration of the substrate may include bars, balls, chain, mesh, plates, saddles, sheet, tubes, wire or the like.

Although the invention is described herein in detail with reference to employing a sodium aluminate solution, it should be understood that other aluminate solutions, e.g., potassium aluminate, are also satisfactory for use in forming an adherent film of alumina on the substrate. Ammonium hydroxide and aluminum may be used for preparation of an ammonium aluminate solution but is less desirable than the alkali metal aluminates for deposition of alumina films on substrates for catalyst preparation in accordance with this invention.

In preparing the structure, the substrate is contracted with an aqueous solution of sodium aluminate whereby an adherent film of alumina is formed thereon, the resulting film being hard, firm and tenacious. X-ray diffraction analysis indicates that the alumina formed or deposited from the sodium aluminate solution is chiefly the trihydrate phase, either as the alpha or beta trihydrate phase. The particular phase initially deposited onto the substrate appears to be largely dependent on the temperature of the sodium aluminate solution employed. Thus, solutions at about room temperature result in the formation of a film comprising about 50% by weight alpha alumina trihydrate and 50% by weight beta alumina trihydrate; whereas, employing sodium aluminate solutions at elevated temperatures, e.g., 125° F. or higher, generally results in a film comprising alpha alumina trihydrate. The phase of hydrated alumina formed on the substrate may be significant in that further transformation of the alumina may be effected where desired, upon dehydration on heating or mild calcination, as explained below in detail. However, the alumina film formed on the substrate may contain a small quantity of some other phase or phases of alumina, as well as several tenths percent sodium oxide (which may be present as sodium aluminate). It should be understood, however, that the alumina film initially deposited on the substrate may be regarded as substantially a hydrate of alumina, and is intended to embrace the film formed on the substrate from a solution of sodium aluminate, which film may undergo additional phase transformation.

The sodium aluminate solution may be obtained or prepared by various methods. For example, aluminum pellets may be dissolved in a relatively strong base, e.g., sodium hydroxide, or if desirable, alumina may be dissolved in an aqueous solution of sodium hydroxide, or commercial sodium aluminate may be dissolved in water. As the alumina film is deposited on the substrate, it is necessary to replenish the sodium aluminate. It is preferable to deposit the alumina from a solution of sodium aluminate and to maintain an excess of aluminum in contact with the solution so that the sodium aluminate is continuously replenished by reaction of aluminum with sodium hydroxide. Generally, the concentration of the sodium aluminate solution is preferably at least 0.5 molar, and advantageously at least 1 molar, in order that a film of alumina deposited or formed be of sufficient depth to be serviceable and be formed within a reasonable period of time. A solution having a concentration of about 1 to 5 molar is generally satisfactory. Concentrations of sodium aluminate as low as about 0.1 molar are effective for deposition of alumina from a solution of a strong base, e.g., sodium hydroxide, if free aluminum is present in the aluminate solution during deposition.

If desired, more concentrated aluminate solutions may be employed for deposition of alumina, but there appears to be no advantage in employing the more concentrated solutions. Although a solution of sodium aluminate at room temperature may be used, formation of the alumina film is somewhat facilitated by contacting the substrate with a solution of sodium aluminate maintained at an elevated temperature. However, as explained above, the temperature of the solution determines to a considerable extent the particular alumina phase formed. Thus, for example, in depositing a film of alpha alumina trihydrate on the substrate it is desirable to employ a solution having a temperature above 125° F., and preferably in the range of 175 to 210° F. Higher temperatures may be used.

The substrate may be contacted with the solution of sodium aluminate as by immersing the substrate when in particulate or filament form, e.g., saddles, spheres, wire screen or mesh, steel wool, etc., in the solution; in forming the alumina film of the interior wall of a tube of substantial length, sodium aluminate solution is added to the tube and permitted to stand therein, preferably in a vertical position, in order to provide a film of uniform thickness. The resulting film of alumina formed on the substrate should be of sufficient thickness to provide adequate capacity for retaining the catalyst deposited thereon. In general, the film of alumina should not be substantially thinner than about 1 mil, and preferably, not less than about 4 mils. Deposits of alumina of almost any thickness are possbile; coatings thicker than 150 mils are generally not advantageous. Usually, films 4 to 30 mils thick are desirable.

In the preferred embodiment of this invention, the alumina in hydrate form deposited on the substrate as an adherent film is subject to heating to drive off at least part of the water of hydration thereby resulting in the transformation to a lower state, or degree of hydration and also to a higher density alumina. Such transformation accompanying heating is well known in the art, and may be found discussed in "Alumina Properties" by J. W. Newsome et al. (Alumina Company of America, 1960, second revision). The temperature required in effecting transformation of the hydrate of alumina depends on such factors as pressure, atmosphere, heating rate and impurities. Thus, for example, both alpha alumina trihydrate and beta alumina trihydrate deposited from a solution of sodium aluminate, as explained above, may be dehydrated to the monohydrate phase upon mild calcining in an atmosphere of air to about 390 to 750° F. and at slightly elevated pressure. The resulting monohydrate phase may be subjected to further heating to about 1000 to 1500° F. thereby transforming it to the gamma phase. On the other hand, beta alumina trihydrate may be transformed to eta alumina upon heating in dry air at a slow rate to about 550 to 950° F. Transformation to gamma alumina or eta alumina is particularly advantageous in that these phases have a large total surface area per unit weight, the surface area being substantially higher than the amorphous forms of alumina, thereby increasing the catalytic activity, per se, and more importantly, resulting in a carrier characterized by a high absorptive property.

The alumina film formed on the substrate serves as a support or carrier for a chromium-containing compound, and also, in the preferred embodiment of our invention, for an oxidation catalyst material. It should be understood, however, as an alternate embodiment of the invention that the alumina coated substrate need not serve as a carrier for the oxidation catalyst. In this alternate embodiment, the oxidation catalyst, which may be supported by alumina pellets, diatomaceous earth, silica gel, or the like, is incorporated in the exhaust system downstream of the chromium-containing compound.

In accordance with the preferred embodiment in which the substrate is a single, substantially continuous unit, the alumina film is formed over the surface of the entire substrate, and then a portion of the alumina film is impregnated with the chromium-containing material and the remainder of the alumina film is impregnated with oxidation catalyst material. On the other hand, the substrate may be provided in separate sections, each section bearing an alumina film. One section is impregnated with the chromium-containing material, and another section with oxidation catalyst material. As a further modification, a packed column or chamber may be employed with a portion of the packing having alumina formed thereon provided with the chromium-containing material and the remainder of the packing impregnated with the oxidation catalyst. The structure is positioned or arranged in the exhaust system of the internal combustion engine such that the exhaust gases emitted therefrom first contact that part of the structure having the chromium-containing material deposited thereon. Solid and reactive lead compounds in the exhaust gases are removed and retained in the chromium-containing section. In this manner, these harmful lead compounds are removed from the exhaust gases which are then contacted with the oxidation catalyst to oxidize the combustible compounds. If harmful lead compounds are not removed from the exhaust gases prior to contact with the oxidation catalyst, the oxidation catalyst is readily poisoned. Thus the removal of the lead compounds from the exhaust gases by the chromium-containing material extends the life of the oxidation catalysts substantially.

The chromium-containing compound or material may be impregnated on the alumina film by contacting the alumina with a solution containing a compound of chromium. This is usually accomplished by immersing the alumina coated substrate in a solution of a salt of the chromium-containing compound. The chromium to be deposited or impregnated on the alumina film may be in the hexavalent form or in the trivalent form. However, hexavalent chromium usually results in a superior catalyst structure of relative greater performance and increased life as compared to the trivalent chromium, and therefore is the preferred form.

Chromium compounds found particularly useful in the preparation of catalysts include the alkali metal chromates, alkali metal dichromates, alkaline earth metal chromates, and alkaline earth metal dichromates. These include, for example, potassium chromate, potassium dichromate, sodium chromate and sodium dichromate, and their alkaline earth counterparts, e.g., calcium chromate. Potassium chromate is preferred. Also useful are other metal chromates and dichromates such as lead chromate, as well as chromic acid. Trivalent chromium compounds which are also applicable include, for example, chromic oxide, chromic sulfate, chromic nitrate, chromic oxalate, and the like. The temperature of the chromium-containing solution employed usually is at about room temperature, and may range from about 40° F. to 200° F., and preferably 50 to 100° F.

The alumina coated substrate having a deposit of a chromium-containing material is desirably dried in air at a temperature approximately that of an exhaust system of an internal combustion engine for the purpose of conditioning the structure. For this purpose, the impregnated alumina film may be air dried at a temperature of from about 500 to 1200° F. A longer period of time is generally required if drying is conducted at the lower temperatures within this range than is required at the higher temperatures. Thus, for example, when drying is 500° F., about 4 hours is adequate drying time; whereas at 1200° F., 1 hour is sufficient. Where required, the impregnation step, and drying operation, may be repeated to assure an adequate deposit of the chromium-containing material. It will be observed that the amount of chromium-containing material deposited on the alumina film may be varied over a large range and will depend primarily upon the requirements of the engine and the type fuel employed in operating it.

The method utilized in depositing or impregnating the oxidation catalyst material upon the alumina coated substrate is dependent to some extent upon the particular catalyst material employed. In one method, the added oxidation catalyst material may be impregnated on the alumina film by contacting the oxide coated substrate with a solution containing the catalyst material. Generally, this is accomplished by immersing the alumina coated substrate in a solution of a salt of the catalyst material. The conditions for impregnating, i.e., concentration, temperature, time and pH, will depend largely upon the material employed and upon the amount of catalyst material required. Although aqueous solutions are usually employed, the catalyst material may be impregnated on the alumina carrier from a non-aqueous solution particularly acetone, ethanol and the like. The deposit is then calcined and activated in place as by oxidizing, reducing, etc. By this method, the alumina film may be impregnated with such catalyst materials as salts or compounds of such metals as copper, silver, zinc, chromium, vanadium, manganese, cobalt, tungsten, nickel, platinum and iron, and combinations thereof. More preferably, the metals include those from the group consisting of Group VIII and Period 4 of the Periodic Table of Elements. The metals from Group VIII include, for example, nickel, platinum, iron and cobalt and combinations thereof, and those metals from Period 4 include, for example, copper vanadium, chromium, manganese, cobalt and nickel, and combinations thereof, preferably copper chromite or mixed oxides of copper and chromium.

Preferred oxidation catalysts for treatment of exhaust gases are copper chromite on alumina and vanadium oxide on alumina, the alumina in each case being formed on a compact mass of metal fibers, e.g., stainless steel wool by deposition from sodium aluminate solution. Suitable vanadium oxide catalyst and copper chromite catalyst are disclosed in a copending application of Robert J. Leak, Ser. No. 202,378, filed June 14, 1962, and now abandoned.

In a preferred embodiment of our invention, vanadium oxide is employed as an oxidation catalyst. The vanadium oxide catalyst may be deposited or formed on the alumina film by impregnation. The alumina coated substrate preferably is immersed in a solution of a compound or salt of vanadium. Compounds or salts found particularly useful or convenient include water-soluble vanadium compounds, for example, ammonium vanadate, potassium vanadate and sodium vanadate, and the less soluble vanadium pentoxide. When employing a solution of a vanadium compound, impregnation is usually facilitated and a more uniform deposition is obtained by employing a complexing agent. For this purpose, we have found it suitable to employ oxalic acid, tartaric acid, citric acid and the like. The temperature of the solution is usually at about room temperature and may range from 40 to 200° F., and more preferably from 50 to 100° F.

The alumina coated substrate, having a vanadium-containing catalyst deposited thereon, is calcined to stabilize the structure for use in the catalytic reaction and to convert vanadium compound to its corresponding oxide. To accomplish this, the impregnated alumina film may be calcined in air at a temperature in the range of from about 500 to 1800° F. and preferably in the range of 900 and 1600° F., and for a period of time in the range of about 1 to about 24 hours which is at least sufficient to convert substantially all of the vanadium to its corresponding oxide. Where required, the impregnation step and calcining operation may be repeated to assure an adequate deposit of catalyst.

In another preferred embodiment of our invention, copper chromite is employed as an oxidation catalyst. The copper chromite oxidation catalyst may be deposited or formed on the alumina film by impregnation similar to the method described above for the preparation of vanadium oxide catalysts. Copper chromite catalysts prepared in accordance with our invention have higher activity, i.e., they are more effective, for oxidation of unburned hydrocarbons in exhaust gases than are vanadium oxide catalysts prepared in accordance with our invention and used under comparable operating conditions. On the other hand, the copper chromite catalyst is more susceptible to deactivation by lead compounds in the exhaust gases than the vanadium oxide catalyst.

Copper chromite is useful as an oxidation catalyst alone or in combination with a vanadium oxide oxidation catalyst. For example, a copper chromite oxidation catalyst of our invention may be used in conjunction with a vanadium oxide oxidation catalyst in an automotive exhaust system wherein the catalysts are arranged so that the exhaust gases, preferably following contact with the lead reactive chromium compound as described above, are brought into contact with the vanadium oxide catalyst and thereafter, into contact with the copper chromite catalyst. As above mentioned, vanadium oxide is less susceptible to lead fouling or lead poisoning than copper chromite, but the exhaust gases effluent from the vanadium oxide catalyst contacting step may have a disagreeable odor. The compounds responsible for the disagreeable odor, probably aldehydes, may be converted to low odor compounds by contacting the exhaust gases with copper chromite catalyst. Alternatively, but less desirable, other combinations of oxidation catalysts can be used. For example, vanadium oxide and copper chromite catalysts may be deposited or formed on the same section of alumina-coated supporting substrate so that exhaust gases simultaneously contact both vanadium oxide and copper chromite catalysts.

Copper and chromium may be co-deposited from a solution of the nitrate salts. The alumina-coated substrate may be immersed in a solution of the nitrates of copper and chromium or the solution may be injected or poured onto the alumina-coated substrate. The co-deposited salts are then heated to decompose the nitrates and form the copper chromite catalyst on the alumina film, as more fully described in the examples. In this manner, the co-deposit of copper and chromium results in catalyst material comprising copper chromite.

Preferably one half to three fourths of the total catalytic structure is impregnated with one or more of the oxidation catalysts described above and one fourth to one half is impregnated with a chromium containing compound as described above to protect the oxidation catalyst from lead poisoning.

Where metal is employed as the material for the extended substrate, the structure of our invention having the chromium-containing material and oxidation catalyst material deposited thereon functions substantially as an isothermal surface. During the catalytic oxidation of exhaust gases, heat transfer from the catalyst to its surroundings is facilitated by the superior heat conductivity of the extended metal substrate. During the initial starting period when the operating temperature is low, heat is conducted throughout the structure thereby bringing it up to operating temperatures. On the other hand, when the temperature is high, heat transfer rates are greater and the metal substrate will conduct the heat to the surroundings thereby facilitating dissipation of heat. Thus, the metal substrate provides an adequate means for controlling the temperature conditions.

In accordance with this invention, the structure is preferably formed from a substrate comprising an aggregate of stainless steel wool. If desired, metal knitted mesh or screen or various combinations of metal fibers in the form of filaments, wires, rods, or the like, randomly disposed or in woven, knit, wound, interlace, bundled, baled, or wrapped form. Woven metal fabric, e.g., stainless steel screen, may be employed to hold stainless steel wool or knit mesh in a desired shaped form, e.g., in cylindrical form and may be spirally or concentrically disposed through the cartridge to prevent bunching or matting of the fibers. The catalytic element may be encased in or surrounded by a metal casing, e.g., sheet metal to form a cartridge. The carriage may be open at one or both ends and may be imperforate or perforated. One or more cartridges may make up the catalytic element and each cartridge may contain one or more catalyst structures.

In a preferred embodiment, the catalyst structure is encased in an imperforate cylindrical casing open at both ends. The substrate is preferably encased prior to coating with the alumina film so that the alumina coats not only the metal fibers, but also coats the casing bonding the substrate to the inside wall of the casing. This provides added rigidity to the substrate and prevents blowby of exhaust gases. The alumina coated substrate can then be impregnated with one or more catalysts. In one specific embodiment, one longitudinal portion of the encased alumina coated substrate and alumina coated inner surface of the casing are impregnated with one catalyst, e.g., potassium chromate, and the other portion of the catalyst and casing impregnated with another catalyst, e.g., copper chromite or vanadium oxide. Alternatively, separate cartridges with different catalysts can be fitted end to end in a suitable container, e.g., an acoustic muffler.

On another embodiment of our invention, the catalyst structure is provided in substantially tubular form comprising one or more tubular members of relatively small inside diameter formed preferably from metal, e.g., steel. The inside diameter of a tubular member, in general, may range from about 0.05 inch to 2 inches, preferably 0.25 to 1 inch. The alumina film is formed on at least one surface or wall of the tubular member, preferably the inside wall, and the alumina film is impregnated with the chromium-containing material, as described above. The tubular member should be of a length sufficient to accomplish the desired removal or depletion of lead compounds from the exhaust gases and for the catalytic oxidation of the combustible compounds during the length of the time required for the exhaust gases to pass therethrough. A number of parallel tubes housed in a single unit may be employed, and may be incorporated into the muffler. The number of tubes should be adequate for an adequate residence time or contact time between the exhaust gases and the catalytic surface. Where desired, the tubular structure may comprise a portion or all of the exhaust pipe.

The following examples illustrate our invention as employed in the exhaust system of a single cylinder internal combustion engine.

Example I

A sodium aluminate solution was prepared by dissolving 600 grams of sodium hydroxide in 10 liters of water contained in a battery jar, and adding thereto 400 grams of aluminum pellets. Two metal mesh cartridges (identified hereafter as cartridge A and cartridge B) were prepared as follows:

Round 6 mil metal knitted mesh consisting of a nickel-chromium-iron alloy and marketed under the trademark Inconel by Metal Textile Corp., was wrapped on a stainless steel screen measuring 13 inches by 3 inches and was then rolled into a cylindrical cartridge. Both cartridges measured 3 inches in length and 2 inches in diameter. Cartridge A weighed 68 grams, and cartridge B weighed 68 grams.

Both cartridges were immersed in the sodium aluminate solution. The solution was maintained at about 175° F., and the cartridges remained in the solution for 24 hours in order that the metal mesh might be uniformly coated with alumina. The cartridges were then removed from the solution, and washed thoroughly with water. The cartridges, having an adherent film of alumina formed thereon, were dried first at 300° F. for 2 hours, and then at 500° F. for 2 hours, and finally at 1000° F. for 2 hours. As a result of the drying and heating, the alumina film comprised essentially gamma alumina. The total weight of cartridge A was 142 grams, the alumina film weighing about 74 grams; and for cartridge B, the total weight was 131 grams, the alumina film weighing about 63 grams.

The alumina film formed on cartridge A was impregnated with a chromate deposit as follows:

50 grams of potassium chromate were dissolved in 100 milliliters of water. The metal mesh cartridge was impregnated with the solution. The temperature of the solution was about 70° F. The cartridge was removed from the solution and then heated in air at 300° F. for 2 hours. About half of the solution was adsorbed by the alumina. The process was repeated to adsorb the remainder of the solution. The cartridge was then dried at 300° F. for 2 hours and calcined at 500° F. for 2 hours and 1000° F. for 2 hours. The total weight of the cartridge was 173 grams.

The alumina film formed on cartridge B was impregnated with a vanadium oxide catalyst as follows:

A solution of vanadium containing material was prepared by first dissolving 300 grams tartaric acid in 700 milliliters of water. To this solution were added 167 grams of ammonium vanadate, and the resulting solution was diluted to 1000 milliliters. The alumina coated metal mesh cartridge was impregnated with 85 milliliters of the resulting solution. Three impregnations were made with the cartridge being heated at 300° F. for 1 hour between each impregnation. After the final impregnation the treated cartridge was heated in air at 300° F. for 1 hour, and then at 500° F. for 2 hours and subsequently at 1000° F. for 2 hours. The total weight for the cartridge was 142 grams.

The above-prepared structure consisting of the two cartridges was evaluated for use in the exhaust system of a single cylinder engine using premium grade motor gasoline containing about 2.2 milliliters of tetraethyllead per gallon. In making the evaluation, two runs were conducted. In the first run, the prepared cartridges A and B were inserted end to end in a chamber 8 inches in length and having an inside diameter of 2 inches. The chamber was then inserted downstream of the engine, and was positioned so that exhaust gases first passed through cartridge A having deposited thereon the chromate before they contacted cartridge B. The second run, which served as a blank, was substantially the same except that a cartridge measuring 6 inches by 2 inches having an alumina film formed thereon and impregnated with vanadium oxide only was evaluated in place of the two 3 inches by 2 inches cartridges. An analysis of the exhaust gases for each run was made with a flame ionization analyzer and detector manufactured by the Carad Corp. The activity, expressed as percent efficiency or percent reduction of hydrocarbon was determined periodically during the test. Throughout the test, the temperature of the catalyst was maintained at 950° F. An ASTM Coordinating Fuel Research engine was used in this test and in comparative tests of subsequent examples.

| Time, hrs. of use | Efficiency,[1] percent |
|---|---|
| 2 | 42 |
| 20 | 36 |
| 40 | 32 |
| 60 | 30 |
| 80 | 30 |
| 100 | 28 |
| 120 | 22 |

[1] Efficiency is calculated as the percentage of total hydrocarbons in the exhaust gas converted to products other than hydrocarbons:

Efficiency (percent) =

$$\frac{(Hydrocarbons\ in - hydrocarbons\ out)}{Hydrocarbons\ in} \times 100$$

In the comparison run, a catalytic element comprising a knitted metal mesh cartridge 6 inches long and 2 inches in diameter weighing 183 grams was coated with 69 grams (weight after calcining at 1000° F.) of alumina and the alumina film impregnated with 15 grams vanadium pentoxide. When tested in the exhaust system of the single cylinder engine at 950° F., the efficiency of this catalytic element dropped from an initial value of 42 percent to 17 percent at the end of 42 hours of operation.

Example II

Cartridges for use in a catalytic muffler were assembled in three cyclinders of carbon steel, each 13¼ inches in length and 4¾ inches inside diameter. Each cylinder was loaded with a cartridge of 6 mil diameter Inconel metal mesh 8 inches long and 4¾ inches outside diameter. Three cartridges of 6 mil Inconel mesh, each 4 inches long and 4¾ inches outside diameter were made up in glass cylinders 4 inches long and 4¾ inches inside diameter. The three steel cylinders containing the Inconel mesh cartridges and the three glass-encased 4 inch long sections of Inconel mesh were placed in about 25 liters of 1.5 N sodium aluminate solution. The temperature of the solution was maintained in the range of 140 to 160° F. for a period of about 30 hours during which the Inconel mesh was coated with alumina. During this period, 2500 g. aluminum pills were added in 500 g. increments. The alumina-coated cartridges were removed from the solution, washed with water and dried at 300° F. for 2 hours, 500° F. for 2 hours and 1000° F. for 2 hours.

The eight inch sections (designated as oxidation catalyst sections 1, 2 and 3, respectively, in the following table) were impregnated with vanadium pentoxide by preparing a solution of ammonium vanadate and oxalic acid of a concentration sufficient to result in 150 grams vanadium pentoxide (upon decomposition) per liter of solution. Each of the three eight inch alumina-coated cartridges was saturated three times with the vanadium containing solution and dried at 300° F. for 2 hours after each wetting with the solution. After the final drying a 300° F. for 2 hours, the impregnated cartridges were heated at 500° F. for 2 hours, and at 1000° F. for 2 hours.

The three four inch alumina-coated cartridges (designated lead conversion sections 1, 2 and 3, respectively, in the following table) were impregnated with potassium chromate by dissolving 242 grams of potassium chromate in 500 ml. of water for cartridge No. 1; 239 grams $K_2CrO_4$ in 500 ml. water for cartridge No. 2, and 286 grams $P_2CrO_4$ in 550 ml. of water for cartridge No. 3. Each of the four inch cartridges were wet with the potassium chromate solution three times and dried at 300° F. for 2 hours after wetting with solution. After the final drying at 300° F. for 2 hours, the cartridges were heated at 500° F. for 2 hours and at 1000° F. for an additional 2 hour period.

The weights (in grams) of the mesh, the alumina coatings and the vanadium pentoxide and potassium chromate catalyst additions of the final calcined cartridges are indicated in the following table.

| | Oxidation Catalyst Section | | |
|---|---|---|---|
| | Cartridge Number | | |
| | 1 | 2 | 3 |
| Mesh (6 mil Inconel), g | 350 | 341 | 345 |
| Gamma alumina, g | 1,321 | 1,347 | 1,261 |
| Vanadium pentoxide, g | 175 | 182 | 142 |
| | Lead Conversion Section | | |
| Mesh (6 mil Inconel), g | 158 | 157 | 133 |
| Gamma alumina, g | 563 | 556 | 666 |
| Potassium chromate, g | 191 | 202 | 252 |

The potassium chromate-impregnated cartridges were removed from the glass cylinders and inserted in the metal cylinders containing the eight inch cartridges impregnated with vanadium pentoxide. The cylinders were then assembled into a catalytic muffler arranged so that the exhaust gases passed through the three metal cylinders in parallel, so that the exhaust gases in each cylinder first contacted the four inch sections impregnated with potassium chromate and then contacted the eight inch sections containing vanadium pentoxide. The assembled muffler was road tested on an eight cylinder, 1960 Oldsmobile for 12,025 miles of road operation. At the end of the test period, the hydrocarbon content of the exhaust gas was reduced by the catalytic muffler from 264 p.p.m. to 219 p.p.m. Analysis of exhaust gases follow the "Test Procedure for Vehicle Exhaust Emission," second draft May 18, 1961, California Motor Vehicle Pollution Control Board. The entire unit had gained 1,741 grams or 3.38 pounds in weight during the test period.

Example III

Three cylindrical containers of carbon steel, each 17½ inches long by 4¾ inches inside diameter, were used. Each was loaded with 415 to 419 grams coarse stainless steel wool. The loaded cylinders were placed in about 40 liters of 1.0 N sodium aluminate solution maintained at 140 to 150° F. A total of 2000 g. of aluminum pills were added to the sodium aluminate solution in 500 gram increments during the 8 hour period required for deposition of alumina on the steel wool. The resulting alumina-coated cartridges were removed, washed with tap water and distilled water and heated in air at 300° F. for 2 hours, at 500° F. for 2 hours, and at 1000° F. for 2 hours. The cartridges were weighed and it was determined that the weight of the calcined alumina deposit on the three coated cartridges were 988 grams, 1004 grams and 1049 grams, respectively.

A solution was prepared by dissolving 3712 grams of chromium nitrate nonahydrate and 2248 grams copper nitrate trihydrate in 1800 ml. water. The total volume of the solution amounted to 5100 ml. The cylindrical cartridges were placed on end in the solution so that one-half of the alumina-coated cartridge in each cylinder was contacted with solution. Each of the cartridges absorbed about 250 ml. of the solution. The cartridges were dried for 2 hours at 300° F. The remaining chromium nitrate-copper nitrate solution was diluted with an equal amount of water and the dipping repeated. Each of the cartridges absorbed about 200 ml. of the diluted solution of the nitrates. The cartridges were then dried at 300° F. for 2 hours and heated to 500° F. for 2 hours.

A second solution was made up by dissolving 1440 grams potassium chromate in sufficient water to make 4 liters of solution. The three alumina-coated cartridges were placed on end so that the part of each cartridge contacted with the potassium chromate solution was that portion of the cartridge not previously impregnated with the solution of copper and chromium nitrates. The cartridge absorbed about 270 ml. of solution each, after which the cartridges were dried for 2 hours at 300° F. and again put in the solution. Each cartridge absorbed about 130 ml. more of the solution. The cartridges were again dried at 300° F. for 2 hours and again put in the solution from which each absorbed and additional 130 ml. After another drying period of 2 hours at 300° F., the cartridges were heated for 2 hours at 500° F. and for 2 hours at 1000° F. After the final heat treatment, the total weight of catalytic additions on the three cartridges were 172 grams, 188 grams, and 178 grams, respectively.

The cylindrical cartridges were assembled into a catalytic muffler assembly so that the exhaust gases from an automobile engine would flow through the three cartridges in parallel, the exhaust gases contacting that portion of each of the cartridges containing the potassium chromate catalyst before coming into contact with the copper oxide-copper chromite catalyst. Tests were made in the exhaust system of an 8 cylinder Oldsmobile engine on a test stand at an engine speed equivalent to 45 miles per hour using premium grade motor gasoline containing about 2.2 milliliters of tetraethyl lead per gallon. The initial activity of the elements, as determined by Carad analysis, was 91%. The activity after an equivalent of 11,200 miles of driving was 39%.

Example IV

Comparative runs were made at 950° F. on the single cylinder, ASTM Coordinating Fuel Research engine of Example I using catalytic elements comprising cartridges of Inconel mesh in the form of cylinders three inches long and two inches in diameter, coated with alumina as in Example I and impregnated with catalyst components as indicated. In Run 1, a cartridge impregnated with potassium chromate was arranged in the exhaust system followed by a cartridge impregnated with vanadium pentoxide. In Run 2, the catalytic elements comprised a potassium dichromate element followed by a vanadium pentoxide element. In this example, Run 1 is the same as Example I. The superiority of potassium chromate over potassium dichromate is evident from a comparison of Runs 1 and 2 after 100 hours of engine operation.

| Time (hrs.): | Run 1 Efficiency,[1] Percent | Run 2 Efficiency,[1] Percent |
|---|---|---|
| 2 | 42 | 47 |
| 20 | 36 | 22 |
| 40 | 32 | 20 |
| 60 | 20 | 18 |
| 80 | 30 | 17 |
| 100 | 28 | 16 |

[1] Efficiency is computed as the percentage of the total hydrocarbon content of the exhaust gas stream converted to products other than hydrocarbons: $\frac{\text{Hydrocarbons in} - \text{Hydrocarbons out}}{\text{Hydrocarbons in}} \times 100$.

Example V

Comparative runs (Runs 1 to 5 below) were made at 950° F. with alumina-coated Inconel mesh cartridges impregnated with calcium chromate, chromium trioxide, chromic oxide, potassium chromate and lead chromate, respectively, with the following results. A single cylinder, ASTM Coordinating Fuel Research engine was used for all tests.

Run 1—CaCrO$_4$-Al$_2$O$_3$-Inconel (6″ x 2″ cartridge).

| Time (hrs.) | Efficiency, percent |
|---|---|
| 0–7 | 66 |
| 23–31 | 43 |
| 47–55 | 35 |
| 71–79 | 22 |
| 95–100 | 27 |

Run 2—[1] CrO$_3$-Al$_2$O$_3$-Inconel (3″ x 2″). Al$_2$O$_3$-Inconel (3″ x 2″ cartridge).

| Time (hrs.) | Efficiency, percent |
|---|---|
| 0–7 | 40 |
| 24–31 | 39 |
| 48–55 | 24 |
| 71–78 | 20 |
| 94–103 | 14 |

[1] Dried at 300° F.

Run 3—[1] Cr$_2$O$_3$-Al$_2$O$_3$-Inconel (3″ x 2″). Al$_2$O$_3$-Inconel (3″ x 2″ cartridge).

| Time (hrs.) | Efficiency, percent |
|---|---|
| 0–8 | 56 |
| 24–32 | 34 |
| 34–39 | 34 |
| 56–61 | 16 |

[1] Calcined at 1000° F.

Run 4—K$_2$CrO$_4$-Al$_2$O$_3$-Inconel (6″ x 2″ cartridge).

| Time (hrs.) | Efficiency, percent |
|---|---|
| 0–3 | 24 |
| 19–27 | 11 |
| 43–52 | 39 |
| 68–76 | 31 |
| 92–100 | 32 |
| 113–116 | 33 |

Run 5—PbCr$_2$O$_4$-Al$_2$O$_3$-Inconel (3″ x 2″). Al$_2$O$_3$-Inconel (3″ x 2″ cartridge).

| Time (hrs.) | Efficiency, percent |
|---|---|
| 0–5 | 27 |
| 21–29 | 29 |
| 26–29 | 12 |
| 45–53 | 12 |

We claim:
1. A structure for use in treating exhaust gases from internal combustion engines operated with fuel containing lead compounds consisting essentially of:
  (a) a metal substrate comprising a mass of metal filaments;
  (b) a substantially uniform adherent film of alumina formed on said substrate by
    (1) contacting said substrate with an aqueous solution of an alkali metal aluminate at a solution temperature in the range of 125 to 210° F. and a concentration of said alkali metal aluminate not less than 0.5 molar for a sufficient period of time to form an adherent film of alumina in hydrate form having a thickness of at least 4 mils,
    (2) then, separating the resulting alumina coated substrate from said solution, and
    (3) finally, removing substantially all water of hydration from said alumina film by heating said coated substrate;
  (c) a chromium compound capable of reacting with lead compounds and selected from the group consisting of alkali metal chromate and alkaline earth metal chromate deposited on the alumina film on a portion of said resulting alumina coated substrate; and (d) an oxidation catalyst selected from the group consisting of vanadium oxide, copper chromite and mixtures thereof deposited on the alumina film on a second portion of said resulting alumina coated substrate substantially free from said chromium compound.

2. A structure according to claim 1 wherein the chromium compound is potassium chromate and the oxidation catalyst is vanadium oxide.

3. A structure according to claim 1 wherein the chromium compound is potassium chromate and the oxidation catalyst is copper chromite.

4. A structure according to claim 1 wherein the chromium compound is calcium chromate and the oxidation catalyst is vanadium oxide.

5. A structure according to claim 1 wherein the chromium compound is calcium chromate and the oxidation catalyst is copper chromite.

6. A structure according to claim 1 wherein the chromium compound is sodium chromate.

7. A structure according to claim 1 wherein the chromium compound is potassium chromate and the oxidation catalyst is vanadium oxide and copper chromium, said vanadium oxide being deposited on a part of the second portion of said alumina coated substrate contiguous to the portion of said substrate where said potassium chromate is deposited and said copper chromite being deposited on another part of the second portion of said alumina coated substrate contiguous to the part of the second portion of said substrate where said vanadium oxide is deposited.

8. A process for treating exhaust gases from an internal combustion engine operated with fuel containing lead compounds which comprises passing said gases in contact with the structure of claim 1, said gases first contacting the chromium compound and subsequently the oxidation catalyst.

9. A process according to claim 8 wherein air is admixed with said gases prior to contact with said oxidation catalyst.

10. A proces for treating exhaust gases from an internal combustion engine operated with fuel containing lead compounds which comprises passing said gases in contact with the structure of claim 2, said gases first contacting the chromium compound and subsequently the oxidation catalyst.

11. A process for treating exhaust gases from an internal combustion engine operated with fuel containing lead compound which comprises passing said gases in contact with the structure of claim 3, said gases first contacting the chromium compound and subsequently the oxidation catalyst.

12. A process for treating exhaust gases from an internal combustion engine operated with fuel containing lead compound which comprises passing said gases in contact with the structure of claim 4, said gases first contacting the chromium compound and subsequently the oxidation catalyst.

13. A process for treating exhaust gases from an internal combustion engine operated with fuel containing lead compound which comprises passing said gases in contact with the structure of claim 5, said gases first contacting the chromium compound and subsequently the oxidation catalyst.

14. A process for treating exhaust gases from an internal combustion engine operated with fuel containing lead compound which comprises passing said gases in contact with the structure of claim 6, said gases first contacting the chromium compound and subsequently the oxidation catalyst.

15. A process for treating exhaust gases from an internal combustion engine operated with fuel containing lead compound which comprises passing said gases in contact with the structure of claim 7, said gases first contacting the chromium compound, then the vanadium oxide and subsequently the copper chromite.

References Cited

UNITED STATES PATENTS

| 3,231,520 | 1/1966 | Leak et al. | 23—2 X |
| 3,272,759 | 9/1966 | Stiles | 23—2 X |
| 3,362,783 | 1/1968 | Leak | 23—2 X |

OSCAR R. VERTIZ, *Primary Examiner.*

EARL C. THOMAS, *Examiner.*

UNITED STATES PATENT OFFICE
CERTIFICATE OF CORRECTION

Patent No. 3,410,651                                                        November 12, 1968

John T. Brandenburg et al.

It is certified that error appears in the above identified patent and that said Letters Patent are hereby corrected as shown below:

Column 4, line 33, "absorptive" should read -- adsorptive --. Column 7, line 47, "carriage" should read -- cartridge --. Column 8, line 8, cancel "the", first occurrence. Column 10, line 15, "$p_2CrO_4$" should read -- $K_2CrO_4$ -- Column 13, line 23, "chromium" should read -- chromite --.

Signed and sealed this 17th day of March 1970.

(SEAL)
Attest:

Edward M. Fletcher, Jr.                             WILLIAM E. SCHUYLER, JR.
Attesting Officer                                            Commissioner of Patents